United States Patent
Yamada et al.

(10) Patent No.: US 7,556,885 B2
(45) Date of Patent: Jul. 7, 2009

(54) BATTERY PACK

(75) Inventors: Hiroyuki Yamada, Fukushima (JP); Kazuo Togashi, Fukushima (JP); Toru Ishii, Fukushima (JP); Takayuki Yamahira, Fukushima (JP); Fumihiko Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 10/982,150

(22) Filed: Nov. 3, 2004

(65) Prior Publication Data

US 2005/0136324 A1   Jun. 23, 2005

(30) Foreign Application Priority Data

Nov. 14, 2003 (JP) ............................ P2003-385287

(51) Int. Cl.
- H01M 2/04 (2006.01)
- H01M 2/08 (2006.01)
- H01M 2/00 (2006.01)
- H01M 2/02 (2006.01)

(52) U.S. Cl. ............. 429/163; 429/175; 429/176; 429/185; 429/164; 429/171

(58) Field of Classification Search ........... 429/163, 429/176, 185, 175, 164, 171
See application file for complete search history.

(56) References Cited

U.S. PATENT DOCUMENTS

| | | | |
|---|---|---|---|
| 6,524,732 B1 * | 2/2003 | Iwaizono et al. | 429/7 |
| 6,696,197 B2 * | 2/2004 | Inagaki et al. | 429/120 |
| 6,861,821 B2 * | 3/2005 | Masumoto et al. | 320/107 |
| 7,014,950 B2 * | 3/2006 | Ozawa et al. | 429/187 |
| 7,150,939 B2 * | 12/2006 | Ohmura et al. | 429/176 |
| 7,285,334 B1 * | 10/2007 | Yamashita et al. | 428/458 |
| 2004/0185330 A1 * | 9/2004 | Yamaguchi et al. | 429/59 |
| 2005/0064286 A1 * | 3/2005 | Kozu et al. | 429/180 |
| 2005/0260492 A1 * | 11/2005 | Tucholski et al. | 429/185 |

FOREIGN PATENT DOCUMENTS

| | | | |
|---|---|---|---|
| JP | 2000-156211 A | * | 6/2000 |
| JP | 2000-251945 | | 9/2000 |
| JP | 2002-008606 | | 1/2002 |
| JP | 2003162987 | * | 6/2003 |
| JP | 2003282039 | * | 10/2003 |

* cited by examiner

*Primary Examiner*—Patrick Ryan
*Assistant Examiner*—Angela J. Martin
(74) *Attorney, Agent, or Firm*—Bell, Boyd & Lloyd LLP

(57) ABSTRACT

A battery pack which can increase of the volumetric efficiency of the battery pack without being contained in a resin mold case is provided. A first laminate material has a concave portion formed by drawing where a battery element is contained. A second laminate material is stacked so as to cover the opening of the concave portion to seal up the periphery of the opening. The first and second laminate materials are bend inwards so as to cover the battery element, and bonded and fixed together by heating. The first laminate material has three-layer structure including a polypropylene layer, a soft aluminum layer, and a nylon layer or PET layer. The second laminate material has a similar structure but includes a hard aluminum layer. Therefore, the second laminate material has enough strength to resist deformation without being contained a cell in a resin mold case.

5 Claims, 3 Drawing Sheets

BATTERY PACK

CROSS REFERENCES TO RELATED APPLICATIONS

This application claims priority to Japanese Patent Document No. JP2003-385287, filed in the Japanese Patent Office on Nov. 14, 2003, the disclosure in its entirety of which is incorporated herein by reference.

BACKGROUND OF THE INVENTION

The present invention relates to a battery pack used in, for example, a lithium ion polymer secondary battery.

Recently, portable electronic apparatuses, such as a laptop personal computer, a mobile phone, and a PDA (personal digital assistant), have been spread, and, as a power source for the apparatuses, a lithium ion battery having advantages, such as high voltage, high energy density, and being lightweight, is widely used.

Further, lithium ion polymer secondary batteries that have solved a drawback of leakage of liquid, which drawback may occur when using an electrolyte in a liquid state, for example, lithium ion polymer secondary batteries using, as an electrolyte, a gelled polymer film containing a polymer impregnated with a non-aqueous electrolytic solution, or an electrolyte in a solid state have been put into practical use.

The polymer lithium ion battery has a construction of a cell including a battery element which has a positive electrode, a negative electrode, and a polymer electrolyte, wherein leads originate from the positive electrode and the negative electrode respectively. The battery element is covered with an outer covering material, such as an aluminum laminate. Further, the cell and a wiring board having a circuit portion mounted thereon are together contained in a box-form plastic molded case constituted by an upper case and lower case. An example of a lithium ion polymer secondary battery having the above described construction is provided in Japanese Patent Application Publication No. 2002-8606.

SUMMARY OF THE INVENTION

The present invention relates to a battery pack used in, for example, a lithium ion polymer secondary battery.

In the battery pack having a conventional construction in which the battery element is contained in the molded case, the molded case has a wall thickness of about 0.3 to 0.4 mm and hence, considering the thickness of a double-sided adhesive tape for fixing the components or the tolerance, the battery pack has a thickness larger than the thickness of the cell by about 0.8 to 1 mm. Further, the upper and lower molded cases need a form in the periphery direction suitable for bonding them together by ultrasonic welding, and therefore they are required to have a wall thickness of about 0.7 mm, so that the battery pack inevitably has a capacity increased 1.3 to 1.4 time the capacity of the cell.

In an embodiment, the present invention provides a battery pack which can suppress the increase of the capacity of the battery pack without sacrificing the mechanical strength and safety.

For achieving the above task, is a battery pack having a battery element of polymer battery is provided in an embodiment, wherein the battery element is covered with a hard outer covering material in a way in which the battery element is put on the hard outer covering material in an opened state; the hard outer covering material is closed and the both ends of the hard outer covering material are bonded together; and the battery pack is shaped so as to have a substantially semicircular form in cross-section in which the both sidewalls expand outwards.

In another embodiment, a battery pack is provided having a battery element of polymer battery, wherein the battery pack has an outer covering material that includes first and second laminate materials having substantially the same size; the battery element is contained in a concave portion formed in the first laminate material, the first and second laminate materials are stacked on one another so that the second laminate material covers an opening of the concave portion to seal up the periphery of the opening; both ends of each of the first and second laminate materials are bonded together outside of a bottom of the concave portion of the first laminate material; and the battery pack is shaped so as to have a substantially semicircular form in cross-section in which the both sidewalls expand outwards.

According to an embodiment, the cell in the pack can be maximized, and hence a high pack energy density can be obtained, thus solving the conventional drawback in that, when the cell is placed in an outer covering molded case, a gap is formed between the case and the cell contained in the case to lower the volume energy density of the battery pack.

In an embodiment, since the battery element has an outer surface covered with a hard laminate film made of a metal, even without using a frame or the like on the side portion of the pack, the battery pack can keep a strength, a flaw resistance, and a satisfactory strength against penetration of a thumbtack or the like.

In an embodiment, merely a frame for holding a wiring board is needed, and the number of parts including an outer covering molded case can be reduced, thus considerably lowering the cost.

Differing from a conventional cell, the cell in an embodiment of the present invention can improve the strength.

The production of the cell part and the production of the pack part in an embodiment can be made through successive steps, thus shortening the time required for the production.

In the present specification, something that has a strip positive electrode, a strip negative electrode, and a polymer electrolyte and/or a separator disposed between the positive and negative electrodes, which are stacked on one another and spirally wound together in the longitudinal direction, wherein lead terminals are came from the positive electrode and the negative electrode respectively, is referred to as "battery element". The battery element that is covered with an outer covering film is referred to as "cell". The cell that further has a circuit required, such as a protective circuit, is referred to as "battery pack".

Additional features and advantages of the present invention are described in, and will be apparent from, the following Detailed Description of the Invention and the figures.

DETAILED DESCRIPTION OF THE INVENTION

Figure 1A:
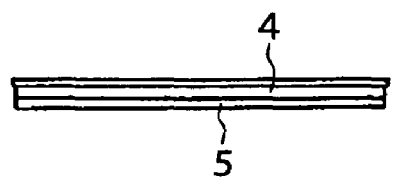
FIGS. 1A to 1D are diagrammatic views for explaining an embodiment of a battery pack according to the present invention.

Hereinbelow, an embodiment of the present invention will be described with reference to the drawings. FIG. 1 shows the construction of a battery pack for a lithium ion polymer secondary battery to which the present invention is applied. Reference numerals 1A and 1B designate first and second laminate materials, respectively, and a battery element is covered with the laminate materials 1A and 1B to constitute a cell. The battery element corresponds to a lithium ion polymer secondary battery and, for example, has a plate form having a long side of 49 mm, a short side of 40 mm, and a thickness of 4.4 mm.

Figure 1B:
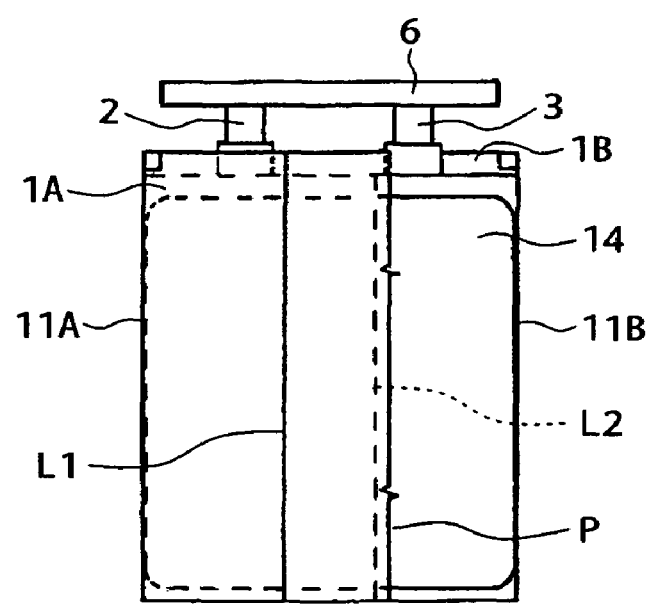
Figure 1D:
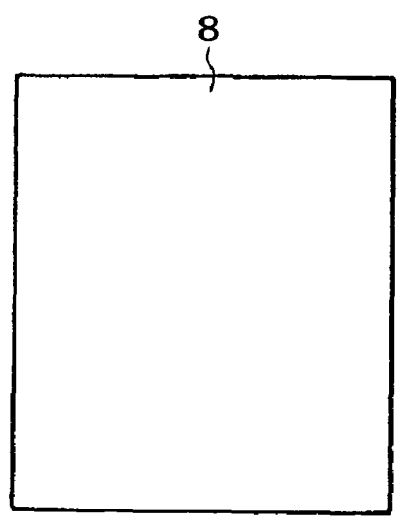
Figure 1C:

The laminate materials 1A and 1B, as described below, constitute a film of a three-layer structure including a bonding layer and a surface protective layer formed on both surfaces of a metal layer. The surface protective layer of the laminate material 1B appears entirely on the outer surface of the cell. FIG. 1B shows a state in which a battery element 14 is exposed by cutting the laminate materials 1A, 1B along a line P and removing them.

Lead terminals 2 and 3 connected to, respectively, the positive electrode and the negative electrode of the battery element are come out. The lead terminals 2, 3 and a protective circuit are bonded together by resistance welding, ultrasonic welding, or the like. As shown in FIG. 1A, a circuit board 6 having mounted thereon the protective circuit and being bonded to the battery element is inserted to a portion between a top cover 4 and a board holder 5 to form a unified block. The protective circuit for the circuit board 6 has a temperature protective element, such as a PTC (positive temperature coefficient) or a thermistor, which cuts the current path in the cell when the circuit becomes a high temperature.

Next, an adhesive or the like is preliminarily charged into the side of the edge face from which the lead terminals 2 and 3 are come out (hereinafter, this side is frequently referred to as "top side"), and then the unified block constituted by the top cover 4, the board holder 5, and the circuit board 6 is inserted into this side. Then, a portion of the cell through which the bonding layer of the laminate material 1B is exposed and a top cover made of a resin, e.g., polypropylene (PP) are bonded together by heat, thus improving the bonding strength.

Then, an adhesive is preliminarily charged into the opposite side of the edge face from which the leads of the cell portion extend from (hereinafter, this side is referred to as "bottom side"), and a rear cover 7 (FIG. 1C) made of a resin is inserted into this side. Finally, an outer covering label 8 (FIG. 1D) made of an aluminum(Al)-deposited PET(polyethylene terephthalate) film having an adhesive is applied to the resultant product.

Figure 2A:
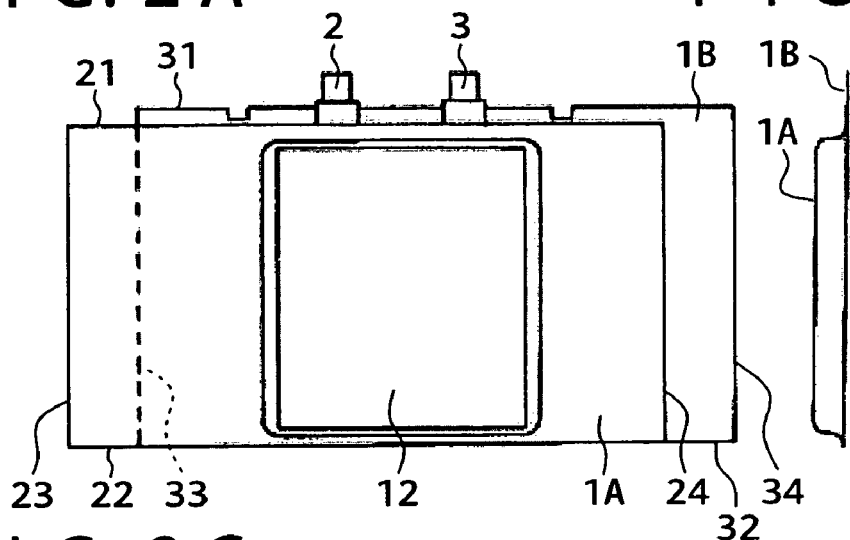
FIGS. 2A to 2C are diagrammatic views showing the state of a cell being produced in an embodiment of the present invention.
Figure 2B:
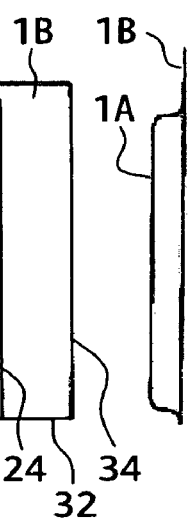
Figure 2C:
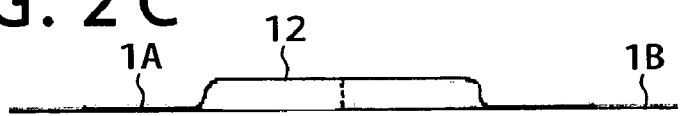

One embodiment of the cell portion is described with reference to FIG. 2. In this embodiment, two types of laminate materials 1A and 1B are used. For containing therein the battery element, the laminate material 1A is preliminarily processed into a predetermined form by drawing using a die. The battery element is contained in a concave portion formed by the drawing. A heat bonding sheet 12 is disposed on the outer surface at a position corresponding to the bottom of the concave portion.

Figure 3:
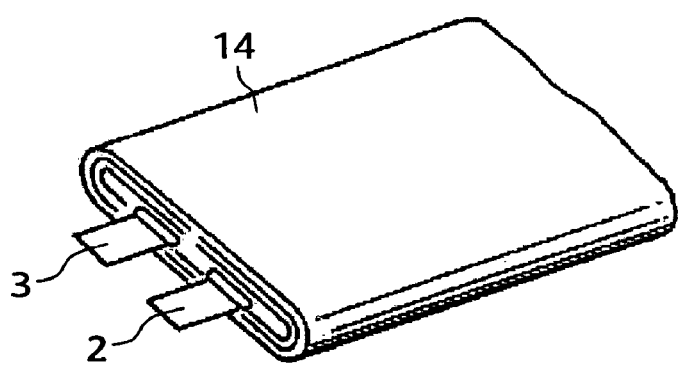
FIG. 3 is a perspective view of a battery element in an embodiment of the present invention.

In FIG. 3, reference numeral 14 designates a battery element. The battery element 14 includes a strip positive electrode, a strip negative electrode, and a polymer electrolyte and/or a separator disposed between the positive and negative electrodes, which are stacked on one another and spirally wound together in the longitudinal direction wherein lead terminals 2 and 3 are came from the positive electrode and the negative electrode, respectively.

The positive electrode is constituted by a positive electrode active material layer formed on a strip positive electrode current collector, and further a polymer electrolyte layer formed on the positive electrode active material layer. The negative electrode is constituted by a negative electrode active material layer formed on a strip negative electrode current collector, and further a polymer electrolyte layer formed on the negative electrode active material layer. The lead terminals 2 and 3 are bonded to the positive electrode current collector and the negative electrode current collector, respectively. As the positive electrode active material, the negative electrode active material, and the polymer electrolyte, the materials already proposed can be used.

In the positive electrode, as the positive electrode active material, a metal oxide, a metal sulfide, or a specific polymer can be used according to the type of the desired battery. For example, when a lithium ion battery is constructed, as the positive electrode active material, a lithium-containing composite oxide comprised mainly of $Li_xMO_2$ (wherein M represents at least one transition metal, and x generally represents 0.05 to 1.10, which varies depending on the charged state or discharged state of the battery) can be used. As the transition metal M constituting the lithium-containing composite oxide, Co, Ni, Mn and/or the like is preferred.

Specific examples of the lithium ion-containing composite oxides include $LiCoO_2$, $LiNiO_2$, $LiNi_yCO_{1-y}O_2$ (wherein 0<y<1), and $LiMn_2O_4$. These lithium-containing composite oxides can exhibit high voltage and excellent energy density. Alternatively, as the positive electrode active material, a metal sulfide or oxide having no lithium, such as $TiS_2$, $MoS_2$, $NbSe_2$, or $V_2O_5$, may be used. In the positive electrode, a plurality of these positive electrode active materials may be used in combination. Further, when the positive electrode is formed using the above-mentioned positive electrode active material, an electrical conductor, a binder, or the like may be added.

As a material for the negative electrode, a material capable of being doped with lithium and dedoped can be used. For example, a carbonaceous material, such as a non-graphitizable carbon material or a graphite material, can be used. More specifically, a carbonaceous material, such as pyrolytic carbon, coke (pitch coke, needle coke, petroleum coke), graphite, glassy carbon, a calcined product of an organic polymer compound (obtained by carbonization of a phenolic resin, a furan resin, or the like by calcining it at an appropriate temperature), carbon fiber, or activated carbon, can be used. Further, as the material capable of being doped with lithium and dedoped, a polymer, such as polyacetylene or polypyrrole, or an oxide, such as $SnO_2$, can be used. When the negative electrode is formed from the above material, a binder or the like may be added.

The polymer electrolyte constituted by a polymer having incorporated thereinto a gelled electrolyte obtained by mixing together a polymer material, an electrolytic solution, and an electrolyte salt. The polymer material has such a property that it is compatible with the electrolytic solution, and, as a silicon gel, an acrylic gel, an acrylonitrile gel, a polyphosphazene modified polymer, polyethylene oxide, polypropylene oxide, or a composite polymer, crosslinked polymer, or modified polymer thereof, or a fluorine polymer material, such as poly(vinylidene fluoride), poly(vinylidene fluoride-co-tetrafluoropropylene), or poly(vinylidene fluoride-co-trifluoroethylene), or a mixture thereof is used.

The electrolytic solution component is dispersible therein the above-mentioned polymer material, and, as an aprotic solvent, for example, ethylene carbonate (EC), propylene carbonate (PC), butylene carbonate (BC), or the like is used. As the electrolyte salt, one which is compatible with the solvent is used, and the electrolyte salt is comprised of a combination of a cation and an anion. As the cation, an alkali metal or an alkaline earth metal is used. As the anion, $Cl^-$, $Br^-$, $I^-$, $SCN^-$, $ClO_4^-$, $BF_4^-$, $PF_6^-$, $CF_3SO_3^-$, or the like is used. As the electrolyte salt, specifically, lithium hexafluorophosphate or lithium tetrafluoroborate is used in such a concentration that it can be dissolved in the electrolytic solution.

In this embodiment, the laminate materials 1A and 1B function as an outer covering material for the above-mentioned battery element. In a conventional lithium ion polymer secondary battery, merely a laminate material of a single layer has been used, whereas, in this embodiment, a stacked structure including two laminate materials 1A and 1B is used.

Figure 5:
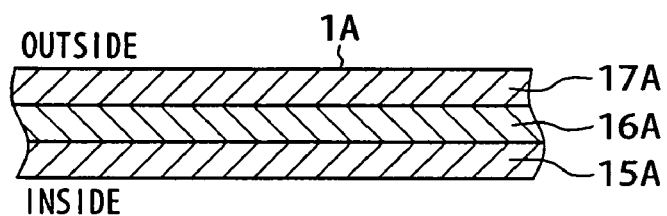
FIG. 5 is a diagrammatic view showing the stacked structure of a laminate material 1A in an embodiment of the present invention.

FIG. 5 shows a stacked structure of the laminate material 1A. As the laminate material 1A, one which is suitable for drawing, and which is suitable for forming therein a concave portion to which the battery element is inserted is used, and the laminate material 1A is softer than the laminate material 1B. The laminate material 1A has, from the inner side (the side in contact with the laminate material 1B), a polypropylene (PP) layer 15A as a bonding layer, a soft aluminum metal layer 16A as a metal layer, and a nylon layer or PET (polyethylene terephthalate) layer 17A as a surface protective layer.

The polypropylene layer 15A prevents the polymer electrolyte from changing in the properties. As the polypropylene layer 15A, casted polypropylene (CPP) or the like is used. For example, the polypropylene (PP) layer 15A having a thickness of about 30 μm is formed.

The soft aluminum metal layer 16A prevents moisture from entering the battery element. As the soft aluminum metal layer 16A, annealed aluminum (3003-O JIS H 4160) or (3004-O JIS H 4160) or the like having a thickness in the range of about 30 μm to about 130 μm is used. The nylon layer or PET layer 17A protects the surface. The nylon layer or PET layer 17A has a thickness of about 10 μm to about 30 μm.

On the other hand, the laminate material 1B is a hard laminate material which can maintain its form when it is bent and which is resistant to deformation due to an external force. The laminate material 1B has a polypropylene layer as a bonding layer, a hard aluminum metal layer, and a nylon layer or PET layer as a surface protective layer.

The polypropylene layer and the nylon layer or PET layer in the laminate material 1B are similar to the corresponding layers in the laminate material 1A. As the hard aluminum metal layer, unannealed aluminum (3003-O JIS H 4160) or (3004-O JIS H 4160) or the like having a thickness in the range of about 30 μm to about 130 μm is used. The thickness of each layer in the laminate materials 1A and 1B is appropriately selected considering the total thickness.

The method for producing the cell portion in one embodiment is described. The laminate material 1A is preliminarily subjected to deep drawing for containing a battery element 14 therein. The battery element 14 is contained in a concave portion formed in the laminate material 1A. In FIG. 2A, the outside of the bottom of the concave portion is shown, and the opening of the concave portion is opposite the bottom.

Next, the laminate material 1B is stacked on the laminate material 1A so that it covers the opening of the concave portion and the respective polypropylene layers of the laminate materials 1A and 1B are opposite each other. In this case, the positions of the laminate materials 1A and 1B are shifted as shown in FIG. 2A. The laminate material 1A has a top-side long side 21 and a bottom-side long side 22 having the same length, and has a left-hand short side 23 and a right-hand short side 24 having the same length. Similarly, the laminate material 1B has a top-side long side 31 and a bottom-side long side 32 having the same length, and has a left-hand short side 33 and a right-hand short side 34 having the same length. The left and right relationship for the position is as viewed in the drawing.

The top-side long sides 21 and 31 and the bottom-side long sides 22 and 32 have, respectively, substantially the same length. The length of the long sides is determined so that the short sides of the individual laminate materials (the short sides 23 and 24, and the short sides 33 and 34, respectively) are in contact with each other or the edge faces of the short sides are opposite each other with a slight gap inbetween in a state in which the laminate material covers the portion for containing the battery element.

A pair of notches are formed in the top-side long side 31 of the laminate material 1B on the extension of the sidewall of the portion for containing the battery element. The bottom-side long sides 22 and 32 have substantially the same length. The short sides 23, 24 of the laminate material 1A are slightly shorter than the short sides 33, 34 of the laminate material 1B. Therefore, when the laminate materials 1A and 1B are stacked on one another, only the laminate material 1B is present near the edge along the top-side long side. When a top cover made of a resin is provided as mentioned above, the polypropylene layer of the laminate material 1B is bonded by heat to the surface of the top cover. The bonding layer of the laminate material 1B may be exposed near the bottom-side edge face.

As shown in FIG. 2A, the concave portion of the laminate material 1A for containing the battery element is formed at a position slightly shifted to the right from the center. The laminate material 1B is stacked on the laminate material 1A so that it is slightly shifted to the right. Therefore, after the laminate materials 1A and 1B are stacked on one another, as shown in FIG. 2A, a left-hand region in which only the laminate material 1A is present and a right-hand region in which only the laminate material 1B is present are formed. The reason that the laminate material is shifted in this way resides in that the polypropylene layer of one laminate material is bonded to another laminate material with a certain bonding width near the seam of the laminate materials 1A and 1B.

Figure 4:
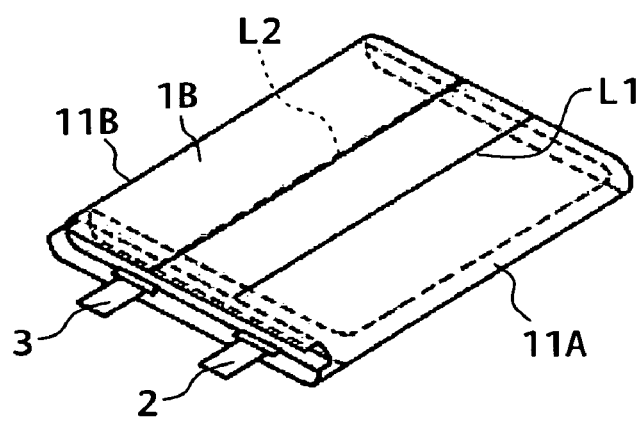
FIG. 4 is a perspective view of a cell in an embodiment of the present invention.
Figure 6A:
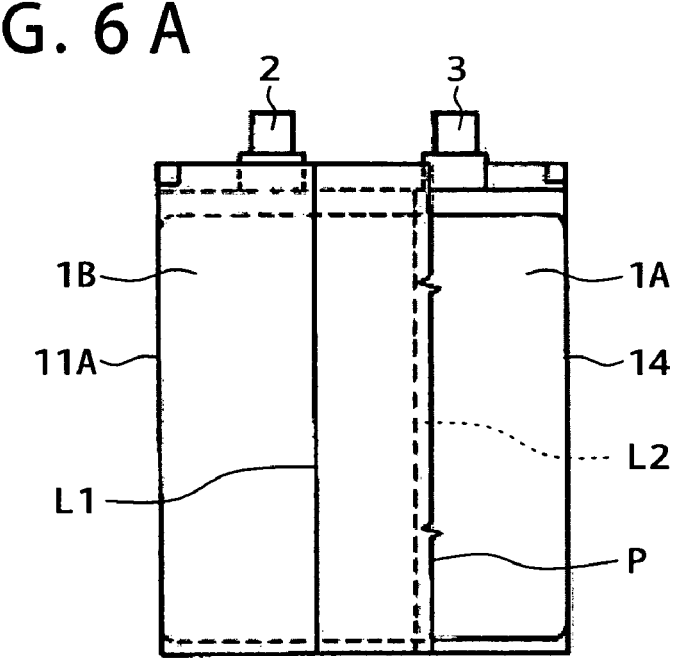
FIGS. 6A to 6C are diagrammatic views of a cell in an embodiment of the present invention.
Figure 6B:
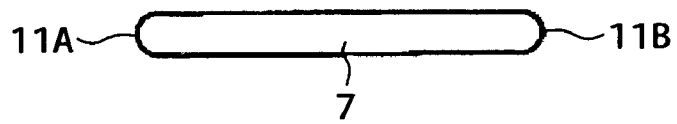

Then, the electrode element is inserted in the arrangement shown in FIG. 2A, and four sides of the periphery of the opening of the concave portion are sealed up while depressurizing. In this case, the whole of the portion at which the polypropylene layers are stacked on one another may be bonded by heat. Then, the sealed battery element is placed in a die, and the battery element is shaped by the die so as to have a substantially semicircular form in cross-section in which the edge faces 11A and 11B on both sides expand outwards as shown in FIG. 4 and FIG. 6B. Like FIG. 1B, FIG. 6A shows a state in which the battery element 14 is exposed by cutting the laminate materials 1A, 1B along a line P and removing them.

Next, as shown in FIG. 2A, a heat bonding sheet 12 having a predetermined form is inserted to the outside of the bottom of the concave portion. The heat bonding sheet 12 is an auxiliary member for bonding together the nylon layer or PET layer 17A of the laminate material 1A, namely, bonding the nylon to nylon or PET to PET by heating to a high temperature. Preferably, considering the total thickness, the heat bonding sheet having a thickness of about 10 μm to about 60 μm and having a melting temperature of about 100° C. is used. The heat bonding sheet 12 preferably has a melting temperature that does not thermally adversely affect the battery element.

Then, the short sides 23, 24 and 33, 34 of the laminate materials 1A and 1B in the opened state shown in FIG. 2A are bend inwards so that the laminate material covers the concave portion containing the battery element therein, and bonded together by heating from the outside, thus fixing the closed state. FIGS. 4 and 6 show a state in which the laminate materials are closed by sealing.

As shown in FIGS. 4 and 6, a seam L1 at which the short sides 33 and 34 of the laminate material 1B are in contact with each other or the edge faces of the short sides are opposite each other with a slight gap inbetween is formed outside of the laminate materials, and a seam L2 at which the short sides 23 and 24 of the laminate material 1A are in contact with each other or the edge faces of the short sides are opposite each other with a slight gap inbetween is formed inside of the laminate material 1B.

Figure 6C:
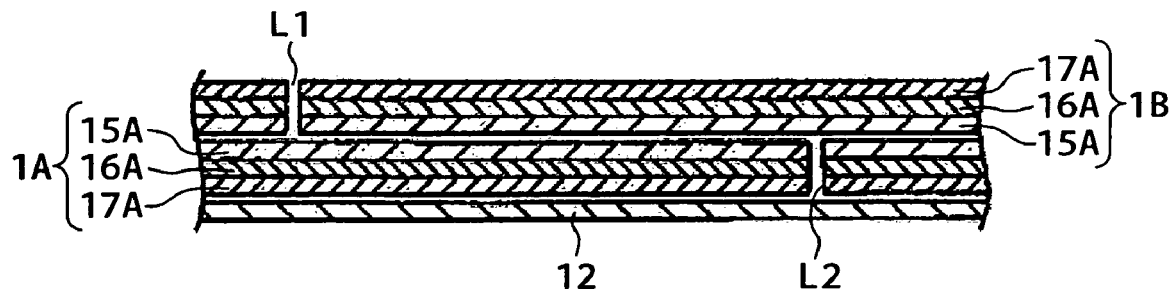

FIG. 6C shows a cross-section of a portion of the seams L1 and L2. Beneath the heat bonding sheet 12 is positioned the nylon layer or PET layer 17A of the laminate material 1A, which is not shown. When the laminate materials 1A and 1B are bent inwards and closed, the laminate materials 1A and 1B are upside down above the heat bonding sheet 12, that is, the laminate material 1A is positioned beneath the heat bonding sheet 12 and the laminate material 1B is positioned above the heat bonding sheet 12. In FIG. 6C, reference numeral 15B designates a polypropylene layer of the laminate material 1B, reference numeral 16B designates a hard aluminum metal layer, and reference numeral 17B designates a nylon layer or PET layer.

As shown in FIG. 6C, the nylon layer or PET layer 17A of the laminate material 1A is positioned above and in contact with the heat bonding sheet 12. Therefore, a structure in which the heat bonding sheet 12 is disposed between the nylon layers or PET layers 17A is formed, and hence the nylon or PET can be bonded together by heating from the outside. Further, the respective polypropylene layers 16A and 16B of the laminate materials 1A and 1B are opposite and in contact with each other, and therefore the polypropylene layers 16A and 16B can be bonded together by heating from the outside.

Thus, a battery pack in which the hard laminate material 1B serves as an outer covering material can be produced without using a box-form case made of a resin and without providing a frame made of a resin on the both sides of the battery pack.

The present invention is not limited to the above-described one embodiment of the present invention, and can be variously changed or modified as long as the effect aimed at by the present invention is not sacrificed. For example, the laminate material 1A inside of the battery pack is not exposed, and hence the surface protective layer is omitted, and a stacked structure may be employed in which polypropylene (PP) layers as bonding layers are disposed on both surfaces of the soft aluminum metal layer 16A (see FIG. 5). In this case, the bonding layers of the laminate material 1A are opposite each other, and therefore the heat bonding sheet 12 can be omitted. Further, other than the heat bonding, a bonding agent may be used.

Further, in the present invention in an embodiment, there may be employed a construction in which the laminate materials 1A and 1B are bent inwards to form an opening in the top portion and bottom portion, and a circuit board is welded to a lead terminal coming from the opening, and then the circuit board is held by a circuit board holder which is separately prepared in a different step, and further the circuit board holder is inserted into the opening while bending the lead terminal.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A battery pack comprising a battery element of polymer battery, wherein
the battery element is contained in a concave portion formed in a soft laminate material and is covered with a hard outer covering material such that the battery element is placed on the hard outer covering material in an opened state, and the hard outer covering material is closed where both ends of the hard outer covering material are bonded together, each of the soft laminate material and the hard outer covering material is a multi-layer film structure; and
the battery pack is shaped so as to have a substantially semicircular form in cross-section in which both sidewalls expand outwards, wherein the battery pack further includes a top cover and a rear cover made of a resin that are inserted into a respective side of an edge face of the battery element wherein the soft laminate material includes a soft metal layer composed of annealed aluminum at a thickness ranging from about 30 μm to about 130 μm, and wherein the hard outer covering material includes a hard metal layer composed of unannealed aluminum at a thickness ranging from about 30 μm to about 130 μm.

2. A battery pack comprising a battery element of polymer battery, wherein
an outer covering material of the battery back comprises first and second laminate materials having substantially the same size, each of the first and second laminate materials is a multi-layer film structure;
the battery element is contained in a concave portion formed in the first laminate material including a soft laminate material;
the first and second laminate materials are stacked on one another so that the second laminate material covers an opening of the concave portion to seal a periphery of the opening;
both ends of each of the first and second laminate materials are bonded together outside of a bottom of the concave portion of the first laminate material; the concave portion of the first laminate material for containing the battery element is formed at a position slightly shifted from the center; the second laminate material is stacked on the first laminate material so that it is slightly shifted; and
the battery pack is shaped so as to have a substantially semicircular form in cross-section in which the both sidewalls expand outwards, wherein the battery pack further includes a top cover and a rear cover made of a resin that are inserted into a respective side of an edge face of the battery element wherein the first laminate material includes a soft metal layer composed of annealed aluminum at a thickness ranging from about 30 µm to about 130 µm, and wherein the second laminate material includes a hard metal layer composed of unannealed aluminum at a thickness ranging from about 30 µm to about 130 µm.

3. The battery pack according to claim 2, wherein positions of the first and second laminate materials are shifted.

4. The battery pack according to claim 2, wherein the bonding layer is a heat adhesion layer, and the respective surface protective layers of the first laminate material are bonded via a heat bonding sheet on an outer surface at the bottom of the concave portion.

5. The battery pack according to claim 2, wherein:
the first laminate material comprises a bonding layer, the soft metal layer and a surface protective layer, which are stacked on one another;
the second laminate material comprises a bonding layer, the hard metal layer and a surface protective layer, which are stacked on one another; and
the respective bonding layers of the first and second laminate materials are stacked so as to oppose each other.

* * * * *